June 10, 1952 C. M. TUTTLE 2,600,343

METHOD OF MAKING CONDUCTIVE PATTERNS

Filed Oct. 7, 1948 2 SHEETS—SHEET 1

INVENTOR.
CLIFTON M. TUTTLE
BY
Davis, Hoxie & Faithfull
ATTORNEYS

June 10, 1952 C. M. TUTTLE 2,600,343

METHOD OF MAKING CONDUCTIVE PATTERNS

Filed Oct. 7, 1948 2 SHEETS—SHEET 2

INVENTOR.
CLIFTON M. TUTTLE
BY
Davis, Hoxie & Faithfull
ATTORNEYS

Patented June 10, 1952

2,600,343

UNITED STATES PATENT OFFICE 2,600,343

METHOD OF MAKING CONDUCTIVE PATTERNS

Clifton M. Tuttle, Halesite, N. Y., assignor to Kenyon Instrument Company, Inc., Huntington, N. Y.

Application October 7, 1948, Serial No. 53,231

14 Claims. (Cl. 204—18)

This invention relates to the production of patterns, especially electrically conductive patterns, and has particular reference to an improved process for making such patterns photographically.

It has been proposed heretofore to form electrically conductive patterns by applying a conducting material to a non-conducting base, as by applying upon an insulating base a solution containing metal, resin and plasticizer and evaporating the solvent to leave a conducting layer upon the base. A problem inherent in such processes is to cause the conductive layer to assume a fine and clearly defined pattern having precisely the desired electrical characteristics. Prior processes for this purpose have not been entirely satisfactory, either because the patterns are not formed with sufficient accuracy, or because they require time-consuming and expensive operations.

The principal object of the present invention is to provide a process by which electrically conductive patterns can be formed accurately in a few simple operations.

In the practice of the invention to form an electrically conductive pattern, a stencil of the desired conductive pattern is produced upon photographic film. It is produced by first printing a photographic latent image of the conductive pattern, which may be effected by any conventional photographic procedure for this purpose, as, for example, by contact printing of a negative upon a typical positive emulsion, or by projection printing. The image is then developed in the usual manner but is not fixed, after which the developed film is immersed in a solution which dissolves the gelatine containing the silver image, leaving the bare base material. Thus, on the portions of the film originally unexposed to light, the gelatine containing the silver halide remains unchanged and forms a very tough gelatino-silver-halide layer which constitutes a stencil defining the desired pattern on the bare base material. This stencil serves to protect the film base, over selective areas, from a conductive coating applied to the stencil side of the film in a subsequent stage of the process.

In the conductive coating stage, the stencil film is subjected to a treatment which softens the bare base material corresponding to the desired pattern, without substantially affecting the gelatino-silver-halide layer. This selective softening is made possible because of the difference in the characteristics of the bare base material corresponding to the originally exposed area, and the gelatino-silver-halide or originally unexposed area, and particularly because of the difference in the reactions of the respective parts to heat or to the action of a solvent for the bare base material. Regardless of whether the softening treatment is effected by heat or by a solvent, it results in a substantial softening of the bare base material while maintaining the gelatino-silver-halide relatively hard, due to the latter being relatively insensitive to the heat or chemical action. The stencil film, thus selectively softened, is covered with a coating of finely divided conducting particles, which become embedded in or adhere to the softened base material but are easily removed from the relatively hard gelatino-silver-halide film, leaving a clearly defined conductive pattern on the insulating base material of the film. This pattern extends over precisely the area formerly occupied by the photographic image on the film.

The film base forms an electrical insulating sheet carrying the conductive pattern, which may be an electrical resistor, capacitance, or inductance, or a combination of such units interconnected to form part of an electric circuit. For some purposes, the film base may not meet completely the desired specifications of the insulating base, in which case a layer of insulating material having the desired characteristics is cast over the conductive side of the film. The casting material is one which will form a strong bond or union with the conductive pattern, as by application of heat. Alternatively, the film may be subjected to an electroplating operation before the casting is made, to build upon the conductive pattern a conducting layer of gradually increasing width which will be firmly embedded in the desired insulating material when it is cast upon the film, the electroplating operation also serving to decrease the electrical resistance of the conductive pattern. In either case, the film base on the opposite side of the film can then be removed, as by dissolving it in acetone or other solvent which removes only the base material, leaving the conductive layer exposed on the casting.

For a better understanding of the invention, reference may be had to the following detailed description, in conjunction with the accompanying drawings in which:

Figs. 1 to 5, inclusive, are enlarged cross-sectional views of the film, showing the changes resulting from the different steps for making the stencil film according to the preferred practice of the invention;

Figure 1:
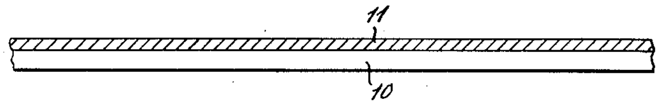

Referring to the drawings, the film as shown in Fig. 1 is a commercially available photographic film having a base 10 of thermoplastic material, and a layer 11 of an unexposed light-sensitive emulsion, which may be a gelatino-silver halide complex commonly used for photographic emulsions. The film base 10 can be cellulose acetate, cellulose nitrate, vinyl polymer, polystyrene, or other dielectric material. As an example, the layer 10 may be about 0.001'' thick, and the layer 11 about 0.0003'' thick.

Figure 2:
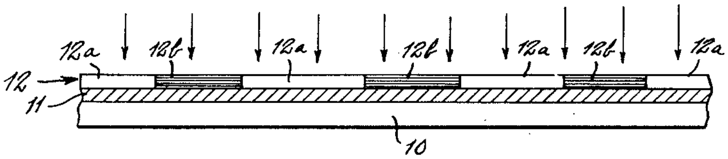
Figure 3:
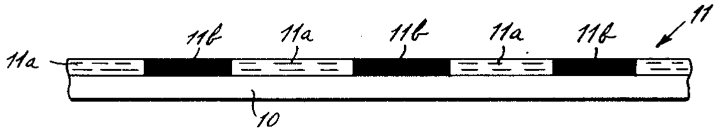

A photographic latent image of the desired conductive pattern is printed on the emulsion layer 11 by any of the conventional procedures, for example, by contact printing of a negative 12 of the image upon a typical positive emulsion 11, as shown in Fig. 2. As there shown, the image is represented on the negative 12 by the more transparent areas 12*a* defined by the relatively opaque areas 12*b*. The image is developed in the usual manner by a suitable developing agent (such as a composition consisting of one liter of water, 90 grams of sodium sulfite, 45 grams of hydroquinine, 37 grams of sodium hydroxide and 30 grams of potassium bromide) but is not fixed, the resulting film 10—11 (Fig. 3) having the developed image 11*a* over the emulsion areas exposed to light passing through the relatively transparent parts 12*a* of the negative 12 in the previous exposure step. As shown in Fig. 3, the developed image 11*a* is defined by the originally unexposed areas 11*b* of the emulsion layer. At this stage, the originally exposed areas 11*a* are silver particles embedded in gelatine, and the originally unexposed areas 11*b* are silver-halide particles embedded in gelatine.

The developed film, which in the previous steps has been maintained in darkness or in photographically inactive light except for the image exposure, is now exposed to light and immersed in a solution which dissolves the exposed gelatine 11*a* containing the silver image but which does not affect the gelatine 11*b* containing the originally unexposed silver halide. Such a solution can be a peroxide bath or a solution made up as follows:

| | | |
|---|---|---|
| Copper nitrate | grams | 50 |
| Potassium bromide | do | 2.5 |
| Glacial acetic acid | cc | 40 |
| Water | cc | up to 250 |
| 3% hydrogen peroxide | cc | 350 |

Figure 4:
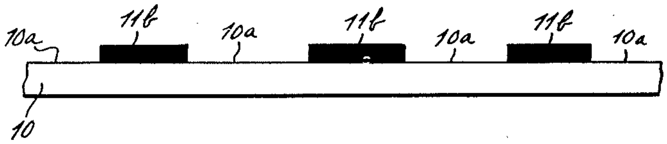

In this solution, the gelatine 11*a* containing the silver image is completely dissolved, leaving the bare base material 10, as shown at 10*a* in Fig. 4. The unexposed gelatine 11*b* with the silver halide remains unchanged to define the stencil image.

The exposed film is next reimmersed in a developer solution, with the result that there remains on the film, at all portions 11*b* originally unexposed, a very tough gelatino-silver-halide, while the base material 10 is completely bare over the originally exposed areas (the image), as shown at 10*a*. The stencil image thus formed by the parts 11*b* serves to protect the film base in the subsequent stage of applying a conducting coating over the film, as will now be described.

Figure 5:
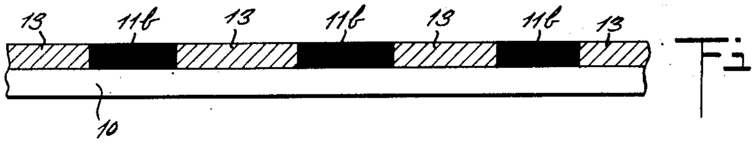

In the coating stage, the stencil film is subjected to a treatment which softens the bare base material 10*a* (Fig. 4) but leaves the gelatino-silver-halide 11*b* relatively hard. The selective softening medium is one to which the bare base material 10 reacts but to which the gelatino-silver-halide 11*b* is relatively insensitive, and it may be applied at such time as to cause a finely divided conductive material to adhere to the base material 10 or become embedded therein. The selective softening medium may be heat or it may be a chemical agent which has a solvent action upon the plastic base material 10, such as ethyl acetate. The gelatino-silver-halide 11*b* is substantially unaffected by the application of heat sufficient to soften the base material 10, or by the chemical solvent for the base material, so that the powdered conductive material will be firmly affixed to the exposed portions 10*a* of the base material, as shown at 13 in Fig. 5, but can be easily removed from the stencil layer 11*b*.

Figure 6:
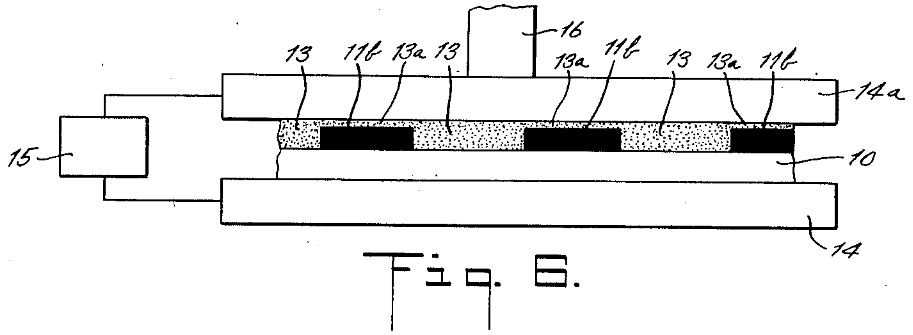
Fig. 6 is a schematic view of an apparatus for softening the bare base material of the stencil film to cause adhesion of the conductive particles thereto, showing the film mounted in the apparatus.

The selective coating with application of heat as the selective softening medium may be effected, for example, by first dusting over the entire upper or stencil side of the film, comprising the bare base portions 10*a* and the gelatino-silver-halide 11*b*, a thick layer of powdered silver or graphite, or any other electrically conductive powder, granular, amorphous or flake, which will fill the spaces between the silver-halide layer 11*b*, as shown at 13 in Fig. 6. The powdered stencil film is then placed between the flat electrodes 14, 14*a* of a dielectric heating unit of the conventional type, in which a high frequency, low voltage current is impressed across the electrodes by the energizing circuit in an electrical apparatus 15, an example of such a unit being disclosed in the September 1943 issue of "Electronics." The sandwich thus formed is subjected to pressure, as by means of a piston rod 16, and the electrostatic field applied by the apparatus 15. The plastic base material 10 is softened by the resultant heating, so that the conductive powder 13 is pressed into and becomes embedded in the bare upper surface of the plastic 10. On the other hand, the gelatino-silver-halide 11*b* remains relatively hard under the dielectric heating, so that any conductive particles 13*a* resting upon it do not become embedded in or affixed to it but can be easily removed, as by brushing when the film is removed from the electrodes 14, 14*a*. Consequently, there remains on the insulating base 10, and affixed thereto, only the conductive pattern 13 and the insulating stencil 11*b* of gelatino-silver-halide.

Figure 7:
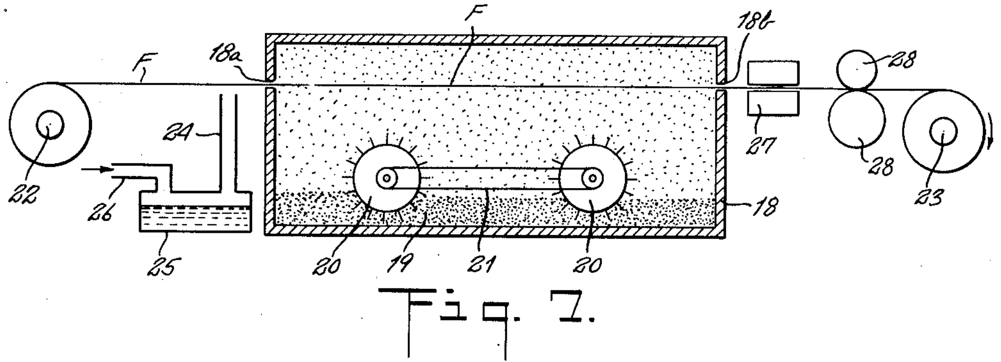
Fig. 7 is a schematic view of another form of such apparatus, showing the stencil film passing through it.

Another form of apparatus for use in applying the conductive coating to the stencil film is illustrated in Fig. 7. As there shown, the apparatus comprises a housing 18 forming a chamber through which the stencil film F is drawn, the chamber having a narrow entrance 18*a* and exit 18*b* for the film. The housing contains a bed 19 of the powdered conductive material, and rotary beaters 20 having blades extending into the bed 19. The beaters are interconnected, as shown at 21, and are rotated rapidly by a drive shaft (not shown) extending through a wall of the chamber and driven from outside the housing. By the action of the beaters 20, the conductive powder in bed 19 is violently agitated, causing a fine suspension of the powder in the atmosphere within the chamber. As the suspended particles tend to settle eventually but other particles are continually thrown upward by the beaters, there is a constant circulation of suspended particles in the chamber.

The stencil film F is delivered from a supply roll 22 on which it is wound after the re-exposing and re-developing steps previously described in connection with Fig. 4. If desired, the film F may be wound directly on the roll 22 as the film is drawn in a continuous strip through successive stations for performing the steps described in connection with Figs. 1 through 4, these steps resulting in a series of stencil images spaced along the film F. From the roll 22, the film F is drawn through housing 18 by a roll 23 on which it is wound after application of the conductive coating. Before the film enters the housing through the entrance 18*a*, its stencil side is exposed to the atomized vapor of an organic solvent for the base material 10. The solvent may be a ketone, an ester, or a chlorinated and aromatic or aliphatic hydrocarbon. It is applied through a tube 24 from a receptacle 25 by air forced into the receptacle through a pipe 26, the air stream serving to atomize the liquid solvent in the receptacle and force the vapor, consisting of a molecular mixture of air and the solvent, through tube 24 to the film. While the solvent is thus applied over the entire stencil surface of film F, including the gelatino-silver-halide 11*b* and the bare parts 10*a* of the base material, it softens the latter parts without appreciably affecting the protective stencil layer 11*b*, which is relatively insensitive to the solvent.

As the film F is drawn through housing 18, conductive particles thrown upward from the bed 19 impinge upon the lower face of the film and firmly adhere to the softened bare base portions 10*a*, eventually forming a solid conductive layer 13 (Fig. 5) of the desired pattern within the spaces defined by the stencil layer 11*b*. Since the stencil layer 11*b* remains relatively hard, the conductive particles impinging upon it will for the most part, at least, drop off and settle back into the bed 19. Such particles as may adhere to the layer 11*b* can be easily removed, as by a brush or scraper 27 arranged to engage the bottom surface of the film as it emerges from exit 18*b*. The conductive powder remaining on the film and filling the spaces between the stencil portions 11*b*, as shown at 13 in Fig. 5, can then be embedded into the base material 10, as by passing the film between pressure rollers 28 before it is wound upon the roll 23.

Instead of spraying the solvent in vapor form upon the stencil film F, the film can be bathed in a liquid solvent, such as ethyl acetate, to which a diluent, such as ethylene glycol mono ethyl ether, has been added. The diluent serves to prevent the solvent from acting too rapidly upon the film base and to prevent too rapid evaporation of the solvent. Too vigorous action of the solvent upon the film base results in a loosening of the gelatine stencil 11*b*; and too rapid evaporation impairs the desired effect of the solvent, which is to soften the bare surfaces 10*a* of the film base and render it sticky or tacky. I find that a 40% solution of the solvent in the diluent is a satisfactory combination under most circumstances. With the base material softened, as described above, and the gelatine stencil layer 11*b* remaining relatively hard, the powder material is spread evenly over the stencil side of the film, as by passing the film through the housing 18, or by simply sifting the powder on the film with its stencil side facing upward. The powder adhering to the bare base portions 10*a*, and filling the spaces between the gelatine portions 11*b*, is then embedded into the base material, as by passing it between pressure rolls 28, or by placing it between the anvils of a press, or by simply pounding the surface with a flat-faced hammer.

Figure 8:
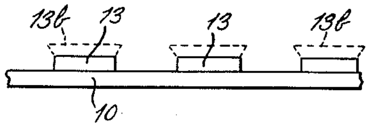
Figs. 8 and 9 are views similar to Figs. 1 through 5 but illustrating additional steps in applying an insulating casting over the conductive pattern.
Figure 9:
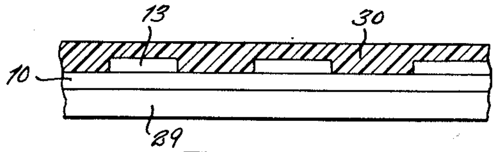

In some instances, it may be desirable to use as an insulating base for the conductive pattern a material other than the film base. In such cases, a stripping film such as a gelatine emulsion of silver bromide, having a fine-grained, high-contrast, hardened emulsion, is processed as previously described to form the desired conductive pattern on the film, the exposed gelatino-silver-halide 11*b* then being developed and removed by a solvent such as the solution previously described for removing the exposed image 11*a*. The conductive silver pattern 13 is now the only material on the film base 10, as shown in Fig. 8. The film is then placed on a flat surface 29, with the conductive layer facing upward, smoothed with water, and flattened down on the surface, as shown in Fig. 9. The film edge may be cemented down on the surface to prevent curling. When the film is completely dried, an insulating material 30 having the desired characteristics, such as methacrylate, a copolymer of an alkyd and a polyester, a silicate or ceramic, is cast over the upper surface of the film to form a strong union with the silver or other conductive material of the pattern. To facilitate the bonding of the casting material 30 with the conductive pattern, the film may be heated to cause a partial melting of the nitrate or other material of the film base, so that the silver particles forming the electrical conducting medium of the pattern are released somewhat from the film base 10 and can become entrained in the surface of the casting material 30. After the casting material has cooled, it is allowed a setting period of 24 to 48 hours, after which the casting material is completely hardened and aged at the surface. The film may then be hot-stamped to drive the conductive pattern farther into the casting material 30 and obtain a better surface smoothness. The remaining nitrate or other base material 10 of the film is then removed, as by washing it with a solvent, such as acetone, which removes only the base material. By using a casting material having a higher melting point than the film base, the latter may be removed by heating the film to melt the base material, instead of dissolving it. When the base material 10 is removed, the conductive pattern remains secured to the casting material 30, which now forms the insulating base.

Figure 10:
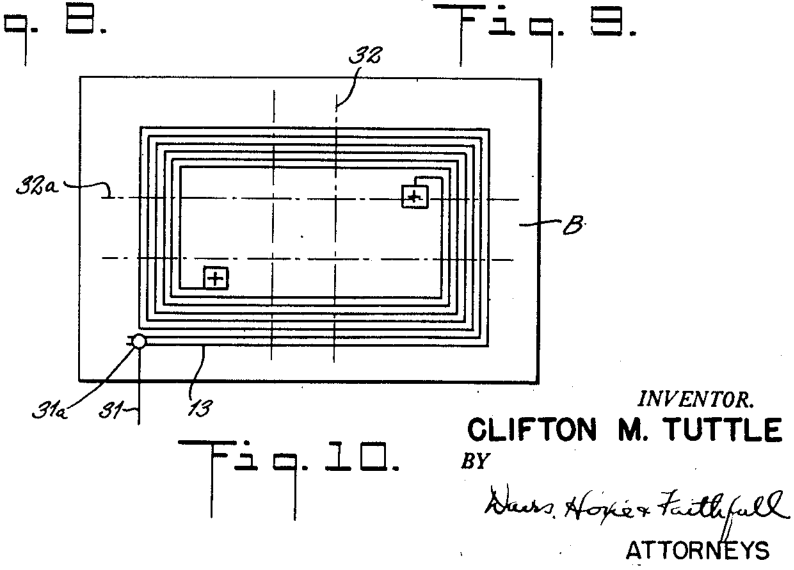
Fig. 10 is a plan view of an electrical unit made in accordance with the invention, illustrating its preparation for an electroplating step to increase the thickness of the conductive pattern.

The conductive pattern 13 of the resulting product may have a long conducting path. For example, a conducting path 13 forming an inductance (Fig. 10) may be arranged in closely spaced, serially connected lines having an overall length of sixty inches on an insulating base area of only a few square inches. In such cases, the electrical resistance of the long path, which consists of a thin metal layer, may be higher than is desired. For instance, the actual resistance may be in the order of several hundred ohms, whereas the desired resistance is in the order of ten to fifteen ohms. One method of reducing the resistance of such a pattern is to apply more conducting material on the pattern by electroplating, the pattern being used as an anode in an electroplating bath. However, the pattern resistance is generally so high that electrochemical deposition is too non-uniform for many purposes, the deposition being much thinner at the end of the pattern path farthest from the anode wire 31.

I overcome this difficulty by applying a lacquer-based conductive cement over the pattern 13 on its base B, which may be the film base 10 or a substitute base 30 applied as previously described. The conductive cement may be a conventional type, such as a cellulose nitrate lacquer containing metallic flake silver. The lacquer, however, is one which is readily soluble in a solvent, such as acetone or ethyl acetate, which is not a solvent for the material of the base B to which the pattern is affixed. The lacquer may be applied with a brush, as no accuracy is required in its application, and it forms a coating for shorting out the turns of the inductance 13, as shown by the dotted lines 32, 32*a* representing areas occupied by the conductive lacquer. When the lacquer dries, the base B is inserted in the electroplating bath and the anode wire 31 attached to the conductive pattern, as shown at 31*a*. Because of the shorting effect of the conductive lacquer 32, 32*a*, the resistance of the pattern 13 is greatly reduced, so that the electro-deposition of additional silver or other conducting material on the pattern is effected readily in a layer of uniform thickness. Upon completion of the plating operation, the shorting cement or lacquer 32, 32*a* is removed by washing the pattern surface of base B with the above-mentioned solvent.

The electroplating operation builds upon the pattern 13 an additional conducting layer 13*b* of dove-tail cross-section, as shown in exaggerated form in Fig. 8, the widest part of the added layer being at the top. Accordingly, when a supplemental or substitute insulating base 30 is cast upon the conductive pattern side of the film, as previously described, the casting material will fill the spaces between the added layers so that the dove-tails 13*b* become firmly embedded in the casting material. In this way, a strong bond is created between the casting material and the conductive pattern.

Electrical units made in accordance with the new process have a strong adherence of the conductive pattern to the insulating base material. In fact, tests have indicated that the adherence is superior to that obtained with the so-called "silk-screen" process for producing conductive patterns on insulating material. Moreover, the conductive pattern obtained by the new process has a high degree of dimensional precision. Additionally, the new process lends itself admirably to low-cost, mass production.

I claim:

1. In the process of forming electrically conductive patterns by applying a conducting layer to an insulating base, the improvement which comprises printing a photographic latent image of the desired conductive pattern upon the gelatino-silver-halide side of a photographic film having a layer of base material supporting the gelatine, developing the image on the film, removing from the film the gelatine containing the image, leaving the bare base material of the film over the area formerly occupied by the image and thus forming a stencil image defined by the originally unexposed gelatino-silver-halide, softening the bare base material while maintaining the remaining gelatino-silver-halide relatively hard, and covering the stencil side of the film with a conductive coating to cause the coating to adhere to the bare base material, thereby forming on the bare base material a conductive pattern corresponding to said image.

2. The improvement according to claim 1, in which the gelatine containing the image is dissolved from the film by a solution in which the originally unexposed gelatino-silver-halide is insoluble.

3. The improvement according to claim 1, comprising also the step of further developing the exposed film after said removal of the image-containing gelatine.

4. The improvement according to claim 1, comprising also the step of casting a layer of dielectric material over the conductive pattern side of the film, to cause the pattern to be bonded to said dielectric material.

5. The improvement according to claim 1, comprising also the steps of removing from the film base said remaining silver-halide stencil, leaving the conductive pattern projecting from the base, and casting a layer of dielectric material over the conductive pattern side of the film, to cause the pattern to be embedded in the dielectric material.

6. The improvement according to claim 1, comprising also the steps of removing from the film base said remaining silver-halide stencil, leaving the conductive pattern projecting from the base, casting a layer of dielectric material over the conductive pattern side of the film, and subjecting the dielectric layer and the film to compression to press the conductive pattern into said last layer.

7. The improvement according to claim 1, comprising also the steps of removing from the film base said remaining silver-halide stencil, leaving the conductive pattern projecting from the base, casting a layer of dielectric material over the conductive pattern side of the film, and removing the film base material from the conductive pattern and the dielectric layer.

8. The improvement according to claim 1, comprising also the steps of electroplating upon the conductive pattern a metal layer of dove-tail cross-section, casting a layer of dielectric material over the conductive pattern side of the film to cause said dove-tail layer to become embedded in the dielectric material, and removing the film base material from the conductive pattern and the dielectric material.

9. The improvement according to claim 1, in which the bare base material is softened by application of heat to the film.

10. The improvement according to claim 1, in which said conductive coating is applied in finely divided particles before the bare base material is softened.

11. The improvement according to claim 1, in which the film, with conductive coating particles applied over the stencil side thereof, is maintained under pressure in an electrostatic field to soften the film base material and embed the particles therein.

12. The improvement according to claim 1, in which the conductive coating is applied by introducing the film, with its base material softened, into an atmosphere containing finely divided conductive particles in suspension.

13. The improvement according to claim 1, in which the conductive coating is applied by introducing the film, with its base material softened, into an atmosphere containing finely divided conductive particles in suspension, and then pressing into the base material the particles adhering thereto from said atmosphere.

14. The improvement according to claim 1, in which the bare base material is softened by applying to the stencil side of the film a solvent for said material in which the gelatino-silver-halide is insoluble, said last solvent being applied without the conductive material, and said material being applied without the solvent and at a different stage in the process.

CLIFTON M. TUTTLE.

REFERENCES CITED

The following references are of record in the file of this patent:

UNITED STATES PATENTS

| Number | Name | Date |
|---|---|---|
| 1,560,437 | Taylor | Nov. 3, 1925 |
| 1,614,263 | Spencer | Jan. 11, 1927 |
| 1,942,686 | Colbert | Jan. 9, 1934 |
| 2,058,396 | Baker | Oct. 27, 1936 |
| 2,413,600 | Bierman | Dec. 31, 1946 |
| 2,441,960 | Eisler | May 25, 1948 |
| 2,443,119 | Rubin | June 8, 1948 |
| 2,447,541 | Sabee | Aug. 24, 1948 |
| 2,447,836 | Beeber | Aug. 24, 1948 |
| 2,506,604 | Lokker | May 9, 1950 |